United States Patent
Hirsch

(10) Patent No.: US 6,747,969 B1
(45) Date of Patent: Jun. 8, 2004

(54) TRANSMISSION GAP INTERFERENCE MEASUREMENT

(76) Inventor: Olaf Hirsch, 394 E. Eaglewood Ave., Sunnyvale, CA (US) 94086

( * ) Notice: Subject to any disclaimer, the term of this patent is extended or adjusted under 35 U.S.C. 154(b) by 0 days.

(21) Appl. No.: 09/447,541

(22) Filed: Nov. 23, 1999

(51) Int. Cl.⁷ ............................................. H04B 7/216
(52) U.S. Cl. ..................... 370/342; 370/335; 370/441; 375/346
(58) Field of Search ................ 375/140, 206, 375/145, 296, 346, 144, 148, 227, 348; 370/18, 19, 342, 528, 535, 534, 540, 335, 332, 140.1, 140.6, 145, 333, 441

(56) References Cited

U.S. PATENT DOCUMENTS

| | | | | |
|---|---|---|---|---|
| 5,761,292 A | * | 6/1998 | Wagner et al. | 379/229 |
| 6,084,904 A | * | 7/2000 | Wang et al. | 370/335 |
| 6,208,683 B1 | * | 3/2001 | Mizuguchi et al. | 375/140 |
| 6,226,315 B1 | * | 5/2001 | Sriram et al. | 370/342 |
| 6,233,231 B1 | * | 5/2001 | Felix et al. | 370/335 |
| 6,307,849 B1 | * | 10/2001 | Tiedemann, Jr. | 370/332 |
| 6,307,870 B1 | * | 10/2001 | Collaud et al. | 370/528 |
| 6,310,868 B2 | * | 10/2001 | Uebayashi et al. | 370/335 |
| 6,314,090 B1 | * | 11/2001 | Nakamura et al. | 370/335 |
| 6,324,159 B1 | * | 11/2001 | Mennekens et al. | 370/203 |
| 6,347,112 B1 | * | 2/2002 | Lattard et al. | 375/130 |
| 6,370,130 B1 | * | 4/2002 | Zhou et al. | 370/335 |
| 6,373,878 B1 | * | 4/2002 | Palenius et al. | 370/335 |
| 6,381,229 B1 | * | 4/2002 | Narvinger et al. | 370/328 |
| 6,385,184 B2 | * | 5/2002 | Kitade et al. | 370/318 |
| 6,452,960 B1 | * | 9/2002 | Sato | 375/140 |
| 2001/0046219 A1 | * | 11/2001 | Kitade et al. | 370/332 |

OTHER PUBLICATIONS

1999 IEEE 49th Vehicular Technology Conference, Houston, Texas, May 16–20, "Capacity Evaluation of the UTRA FDD and TDD Modes", pp. 1999–2003.

IEE Electronics & Communications Colloquium "UMTS Terminals and Software Radio", Monday, Apr. 26, 1999.

T. Dohi et al, "Performance of SIR Based Power Control in the Presence of Non–Uniform Traffic Distribution," 1995 Fourth IEEE International Conference on Universal Personal Communications Record, pp. 334–338, Nov. 1995.

Proposal for Downlink Interference Measurement Method, Revised, TSG–RAN Working Group 1 Meeting No. 5, TSFR1#(99)644 by Ericsson.

Downlink Interference Measurement Method Using Reserved Code, TSG–RAN Working Group 1 Meeting No. 7, TSGR1#(99)B57 by Siemens.

* cited by examiner

Primary Examiner—Sinh Tran
Assistant Examiner—Eliseo Ramos-Feliciano
(74) Attorney, Agent, or Firm—Aaron Waxler

(57) ABSTRACT

The present invention is directed to systems and methods for measuring the interference for computation of signal to interference ratio (SIR) in DSSS CDMA cellular communication systems, by selectively using a transmission gap in one of the control channels. A specific example embodiment is directed to the computation of the SIR in a system, such as the 3GPP system, where PCCPCH data is multiplexed with SCH data in the downlink from the base station. At the mobile unit, once the PCCPCH is located in the received communication signal, the receiver measures the traffic interference in a chip period in the PCCPCH channel that corresponds to an interval where there is a transmission gap in the PCCPCH data. This gap is provided in the 3GPP system for permit the transmission of primary and secondary SCH data. The SIR is readily determined using the measured interference in the transmission gap.

25 Claims, 4 Drawing Sheets

TRANSMISSION GAP INTERFERENCE MEASUREMENT

FIELD OF THE INVENTION

The present invention relates generally to radio-signal communication and, more particularly, to systems and methods for determining the signal to interference ratio in a code-division-multiple-access (CDMA) cellular communication system.

BACKGROUND OF THE INVENTION

In the past few decades, cellular communication systems have developed from test systems in a few target cities to meeting a seemingly unlimited demand internationally. A "cellular" communication system includes multiple communication cells (a.ka., regional zones) arranged adjacent one another to cover a larger regional area. Each cell limits the number of possible simultaneous communications to the number of channels provided in the cell. The size of the cell is defined through receivers and transmitters (a.k.a., transceivers) located within base stations that provide the communication channels through which the mobile radios communicate. Accordingly, a mobile radio communicates in a cellular system by determining the nearest base station and then establishing a radio communication link with that base station.

In providing a clear channel between the mobile radio and the selected base station, the prevention of interference from and to other radio communication links is an important concern. Generally, this concern is addressed through the use of an accurate method for determining with the nearest base station and by controlling the transmission power levels used in maintaining the communication. If the nearest base station is not accurately selected or changes without a timely update, the communication can overlap and interfere with other communications in the system. Similarly, if the transmission power used in maintaining the radio link within a given cell is not properly controlled at relatively low level, the excessive transmissions can cause intolerable levels of interference.

In some cellular communication systems, the mobile stations select the nearest base station by monitoring a control channel transmitted from each base station for its signal strength and selecting the nearest base station by comparing these channel reception levels for the best signal quality. The transmission power is controlled at minimum levels by using algorithms at the base station and/or the mobile radio and, in some systems, also by passing control information between the base station and the mobile radio during the communication.

Many recently-developed cellular systems use direct-sequence, spread-spectrum (DSSS) code-division-multiple-access (CDMA) communication, which permits more users per channel and increases channel clarity and security. In these systems, the same frequency is commonly used by a plurality of users by breaking apart the communication and transmitting using different codes. At any given frequency, the signals of other users interfere with the measurements for the signal quality of the transmitting base stations. To account for this interference, measurement methods determine the signal quality by computing the ratio of the signal reception level and the interference level, which is known as "SIR" or Signal to Interference Ratio. Accordingly, with the signal quality determination being directly dependent on the SIR, the operability of such cellular systems is directly dependent on the signal reception level and, therefore, directly dependent on the manner in which power levels from the base stations are controlled. For further information relating to controlling transmission power based on the received SIR, reference may be made to T. Dohi, et al: "Performance of SIR Based Power Control in the Presence of Non-uniform Traffic Distribution," 1995 Fourth IEEE International Conference on Universal Personal Communications Record, pp. 334–338, November 1995.

The industry has recognized that determining the SIR in such systems is far from obvious. For example, complexities in determining how to measure the interference include, among other factors, the communication distance between nodes and environment-dependent factors such as intra-cell orthogonality. In connection with the $3^{rd}$ Generation Partnership Project Proposal 3GPP TS25.213, Version 2.3.0 (1999), various approaches have been proposed for determining the SIR in DSSS CDMA cellular communication systems. Two such approaches respectively include measuring the reception level by dedicating otherwise unused orthogonal variable spreading factor (OVSF) codes or by using designated periods in the channelization codes defined by each cellular system. OVSF codes are used by the base station transmitter to spread the signal through the bandwidth and by the receiver to despread and demodulate the received signal. While each of these proposed approaches appears feasible, their respective implementations can be relatively burdensome, complex and reduce the overall system capacity. Further, determining the SIR as a function of designated periods in the channelization codes can be disadvantageous in view of the complexity involved in calculating the interference from the whole signal. For further information relating to such proposals, reference may be made to the following papers: "Proposal for Downlink Interference Measurement Method, Revised," TSG-RAN Working Group 1 Meeting No. 5, TSGR1#5(99)644, submitted by Ericsson; and "Downlink Interference Measurement Method Using Reserved Code," TSG-RAN Working Group 1 Meeting No. 7, TSGR1#7(99)B57, submitted by Siemens.

Accordingly, there is a need for an improved approach to signal quality measurement and SIR determination in such systems.

SUMMARY OF THE INVENTION

The present invention is directed to signal quality and SIR measurement in connection with the operation of direct-sequence-spread-spectrum (DSSS) code-division-multiple-access (CDMA) communication systems and in a manner that overcomes the above-mentioned concerns. The present invention is exemplified through a number of implementations and applications, some of which are summarized below.

Various example embodiments of the present invention are directed to overcoming the above-mentioned concerns. For DSSS CDMA cellular systems, a control channel (e.g., used for data transmission by the base station) includes a transmission gap for the transmission of data from another control channel. At a receiver (e.g., in a mobile radio), the transmission gap in the control channel corresponds to an interval in each CDMA access slot when data is not being transmitted the control channel and where the traffic of other users can be detected. This traffic is the interference factor "I" in the SIR and, therefore, can be used with the measured signal reception level to compute the SIR.

In one example embodiment, a signal-receiving method for use in a DSSS CDMA communication includes: locating a first control channel that is multiplexed with another channel in a received communication signal; selecting a transmission gap in the first control channel where data for other control information is being transmitted in place of the first control channel; measuring interference from other radio links in the transmission gap; and determining a signal quality for the received communication signal as a function of the measured interference.

In a more specific example embodiment, the present invention is directed to the 3GPP system that uses a primary control channel, referred to as PCCPCH (primary common control physical channel), for transmitting data from the base stations. The PCCPCH has a period of 256 chips in which data is not transmitted. In this context, a "chip" (or sometimes "chip interval") refers to a duration of the bit pulse in the waveform used to spread the signal in the modulation stage. The base stations multiplex the PCCPCH and another set of channels (primary and secondary SCH channels), by gapping data in the PCCPCH channel for a chip interval (e.g., 256 chips) per slot to permit transmission of data for the SCH channels. According to the present invention, this transmission gap is used by the mobile radio to measure the interference factor for the SIR.

Other example embodiments of the present invention are directed to specific methods and arrangements involving use of such a transmission gap in a control channel.

The above summary of the present invention is not intended to describe each illustrated embodiment or every implementation of the present invention. For example, in other embodiments, various aspects of these embodiments are combined. The figures and detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
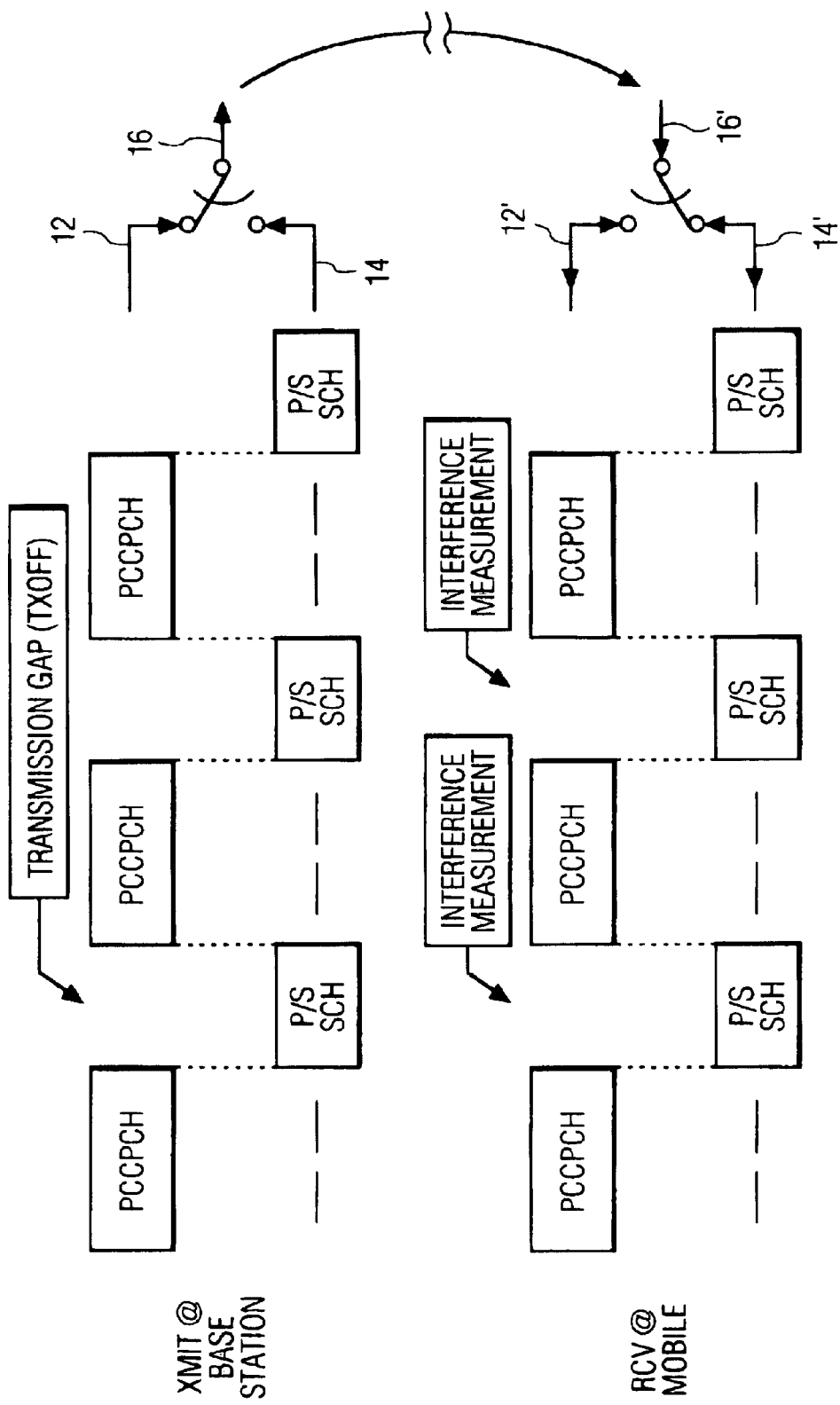
FIG. 1 is an illustration of an approach for multiplexing control channels in an example CDMA communication system, with one of the channels including a transmission gap for measurement of interference, according to one aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to code-division-multiple-access (CDMA) communications systems which require or benefit from measuring interference from other signals sharing the same channel. The invention has been found to be particularly beneficial in direct-sequence, spread-spectrum (DSSS) CDMA cellular systems that multiplex multiple control channels by including a transmission gap in one of the control channels for transmission of data for another one of the control channels. The 3GPP system is one such system including base stations adapted to multiplex the data in the primary common control physical control channel (PCCPCH) with data in another set of channels, referred to as the primary and secondary synchronization channels (SCH). While the present invention is not necessarily limited to this type of system, an appreciation of the present invention is presented by way of example embodiments directed thereto.

Turning now to the drawings, FIG. 1 illustrates the internal operation of a base station directing data from two control channel paths 12 and 14 to a multiplexer 16, and a mobile directing data from a demultiplexer 16' to corresponding control paths 12' and 14'. In the base station, the upper control channel depicts a first control channel including a transmission gap during which data for the first control channel is not transmitted. The multiplexer 16 is adapted to pass data from the lower control channel path during this transmission gap. From the multiplexer 16, the data is combined with other information before being upconverted for transmission by the base station. In the mobile, the data in these two control channel paths are decoded in essentially the reverse order of the encoding of the base station.

In the 3GPP system, the upper control channel 12 of FIG. 1 corresponds to the PCCPCH, including its 256 chip transmission gap during which PCCPCH data is not transmitted, and the lower control channel 14 path corresponds to a summation of data from the primary and secondary SCH as transmitted during this 256 chip gap in the PCCPCH. Using an interference measurement performed in this 256 chip transmission gap, a mobile radio receiver can readily compute the signal to interference ration (SIR). For additional information regarding the 3GPP system, reference may be made to the "Utran Overall Description," 3GPP TS.25.401 (see http://www.3GPP.org).

Figure 2:
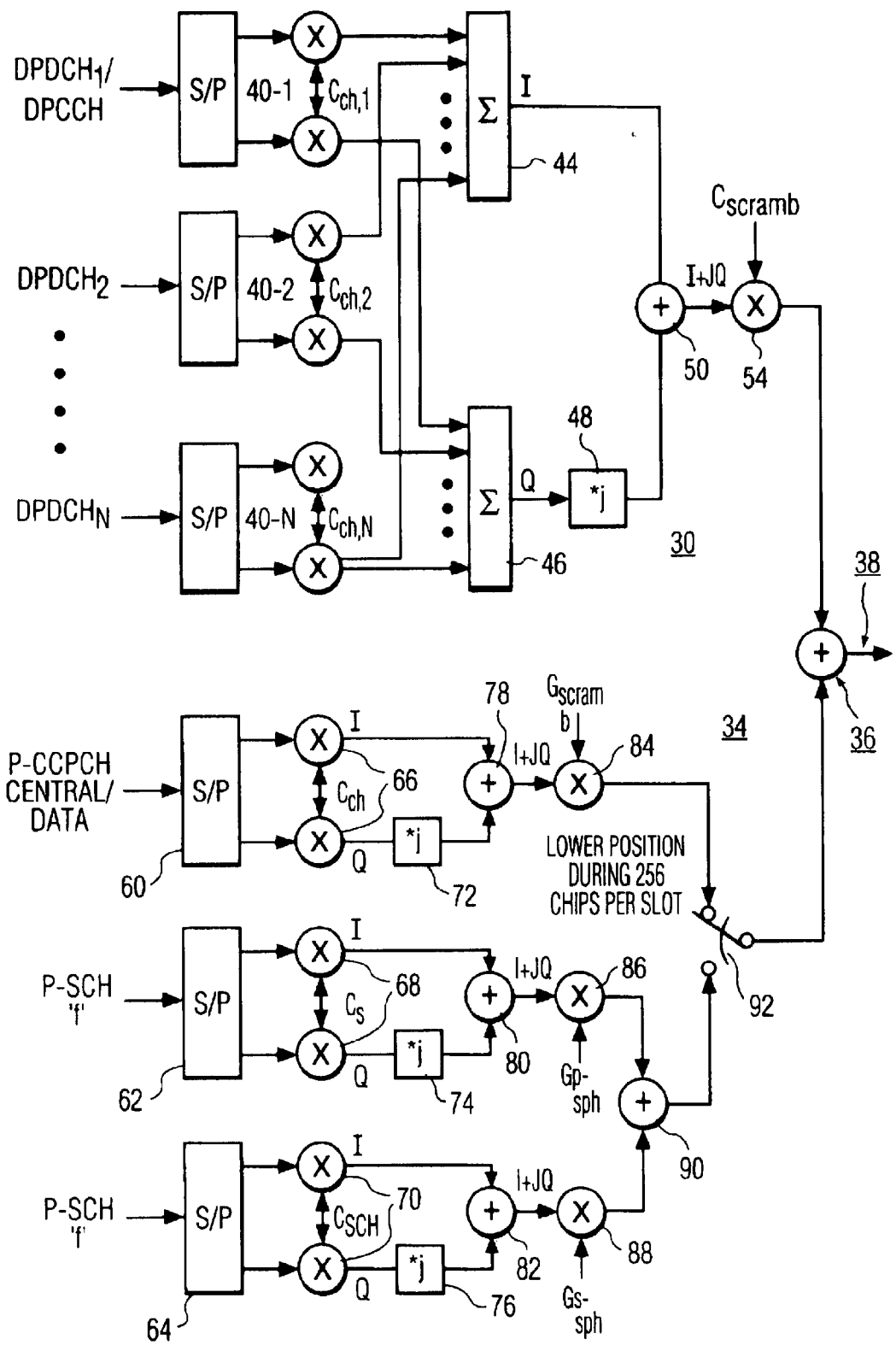
FIG. 2 is block diagram illustrating the functional operation of spreading/modulation from a base station, according to a conventional CDMA cellular communication system.

FIG. 2 depicts the multiplexing operation in FIG. 1 for the 3GPP system using a block diagram showing the functional operation of the spreading/modulation of the various channels, including the PCCPCH and P/S SCH, as depicted in 3GPP TS25.213, Version 2.3.0 (page 18). The arrangement of FIG. 2 includes a circuit 30 for spreading/modulation for the downlink DPCH channels, a circuit 34 for spreading and modulation for the SCH and PCCPCH channels, and a summer 36 adapted to combine the outputs of circuits 34 and 36 into an output signal at 38.

The spreading/modulation circuit 30 includes signal mixing circuits 40-1, 40-2, . . . 40-N, which mix the data from each of the input DPCH channels with the appropriate OVSF spreading code. The outputs of the signal mixing circuits are fed to blocks 44 and 46 for development of the I and Q components before processing at complex-variable transformer 48 and being summed at block 50. The output at block 50 is then code-multiplexed using designated PN codes as inputs to a mixer 54.

The spreading and modulation circuit 34 for the SCH and PCCPCH channels includes signal mixing circuits 60, 62, and 64, which mix the data from the PCCPCH and the primary and secondary SCH channels using designated PN codes as inputs to mixer stages 66, 68 and 70. The outputs of the mixer stages 66, 68 and 70 are processed for development of the I and Q components, with the Q components being processed by complex-variable transformers 72, 74 and 76 and the I and Q components summed at blocks 78, 80 and 82. These data are then code-multiplexed using PN codes as inputs to a mixers 84, 86 and 88. The data at this stage in the primary and secondary SCH channels are summed at summer 90, and the sum is then time multiplexed with spread data in the PCCPCH using multiplexer 92.

The multiplexer 92 is adapted as described above in connection with the multiplexer 16 of FIG. 1. In this manner, the primary and secondary SCH channels are code multiplexed and transmitted simultaneously during the first 256 chips of each slot, which leaves the above-discussed transmission gap for interference measurement at the receiving end, as illustrated and described in connection with FIG. 1.

Figure 3:
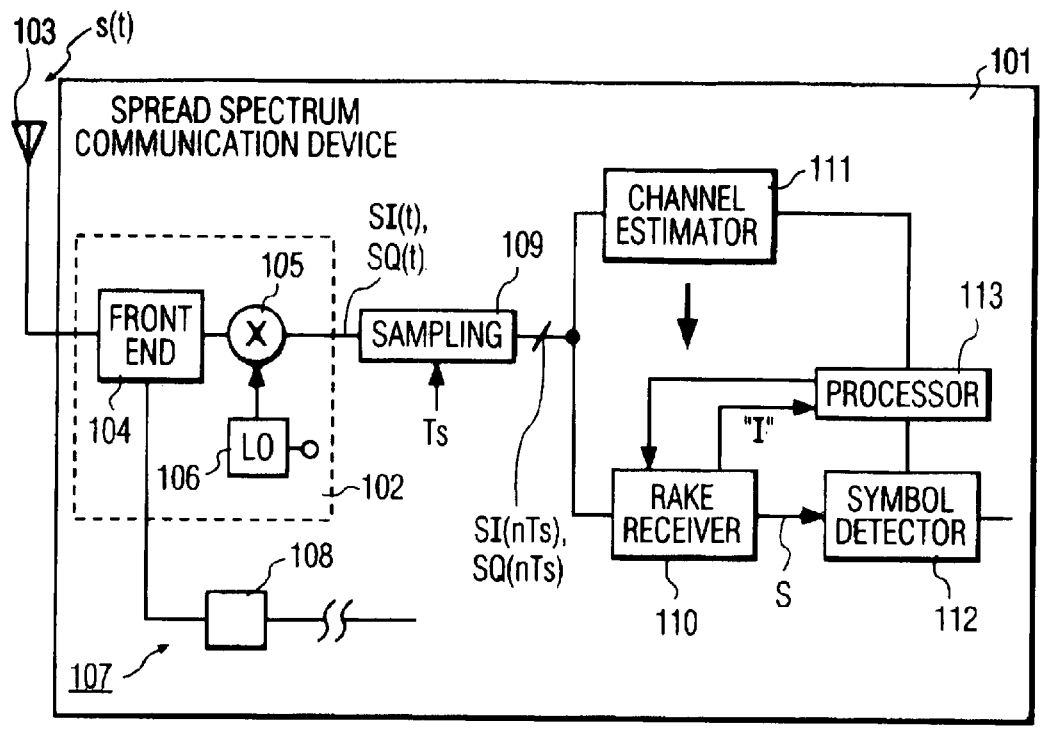
FIG. 3 is a block diagram of a spread spectrum communication device, according to an example embodiment of the present invention.

FIG. 3 is a block diagram of an example spread spectrum communication device 101 adapted to perform the interference measurements according to the present invention. The spread spectrum communication device 101 is used in a DSSS CDMA cellular system, wherein a symbol to be transmitted to the spread spectrum communication device 101 is spread by a pseudo-noise (PN) reference sequence with a chip rate that is substantially greater than a symbol rate of the symbol, so as to form a spread spectrum signal. Such a spread spectrum signal is modulated onto a carrier for transmission as described, for example, in TIA/EIA Interim Standard TIA/EIA/IS-95-A.

The spread spectrum communication device 101 receives a modulated spread spectrum signal s(t). In the spread spectrum communication device 101, received multipath components of the transmitted modulated spread spectrum signal s(t) are resolved at sub-chip resolution. The spread spectrum communication device 101 includes a receiver front-end 102 coupled to an antenna 103 receiving the modulated spread spectrum signal s(t). The front end 102 includes a front end block 104 for filtering and amplifying the received signal s(t), and a carrier demodulator in the form of a mixer 105 coupled to a local oscillator 106 for demodulating the received signal s(t). The spread spectrum communication device 101 can be a unidirectional device only receiving the signal s(t), or as in most applications, the device 101 is a bi-directional communication device.

The spread spectrum communication device 101 also includes a transmitter branch 107 of which a power amplifier 108 is shown. The transmitter branch 107 is adapted to generate a spread spectrum signal as described in the above-mentioned TIA/EIA Interim Standard document. The mixer 105 provides a demodulated spread spectrum signal, in the form of quadrature base band signals sI(t) and sQ(t), to a sampler 109 for obtaining quadrature base band samples sI(nTs) and sQ(nTs) from the signals sI(t) and sQ(t), t being time, n being an integer, and 1/Ts being a sampling rate exceeding the chip rate of the received signal s(t). The spread spectrum device 101 can retrieve the symbols or the bits intended for it by correlating the samples with a locally generated pseudo-noise sequence which is the same as the pseudo-noise reference with which the symbol was transmitted.

For performing such a correlation and the combining of targeted multipath components of the received modulated signal, the spread spectrum communication device 101 includes a rake receiver 110 and a conventional channel estimator 111. The channel estimator 111 estimates channel characteristics of the multipath components intended for it from the samples sI(nTs) and sQ(nts), at the sub-chip resolution, and provides information to branches of the rake receiver 110, which samples to process (from the stream of samples sI(nTs) and sQ(nTs)) such information being indicated in FIG. 3 with a bold arrow. The channel characteristics are represented by correlation results, and within chip intervals the channel estimator 111 determines local maximums of such correlation results and corresponding sample positions.

The rake receiver 110 of FIG. 3 is further adapted to measure the interference during the chip interval corresponding to the transmission gap in the PCCPCH. This can be achieved using one of various approaches including the example approach discussed below in connection with FIG. 4. In this example application, the measured interference is passed the processor 113 which, using the signal strength of the received signal, computes the SIR.

The spread spectrum communication device 101 further comprises a symbol detector 112, and a processor 113 coupled to the rake receiver 110, the channel estimator 111, and the symbol detector 112. Each of these blocks can be implemented conventionally.

Figure 4:
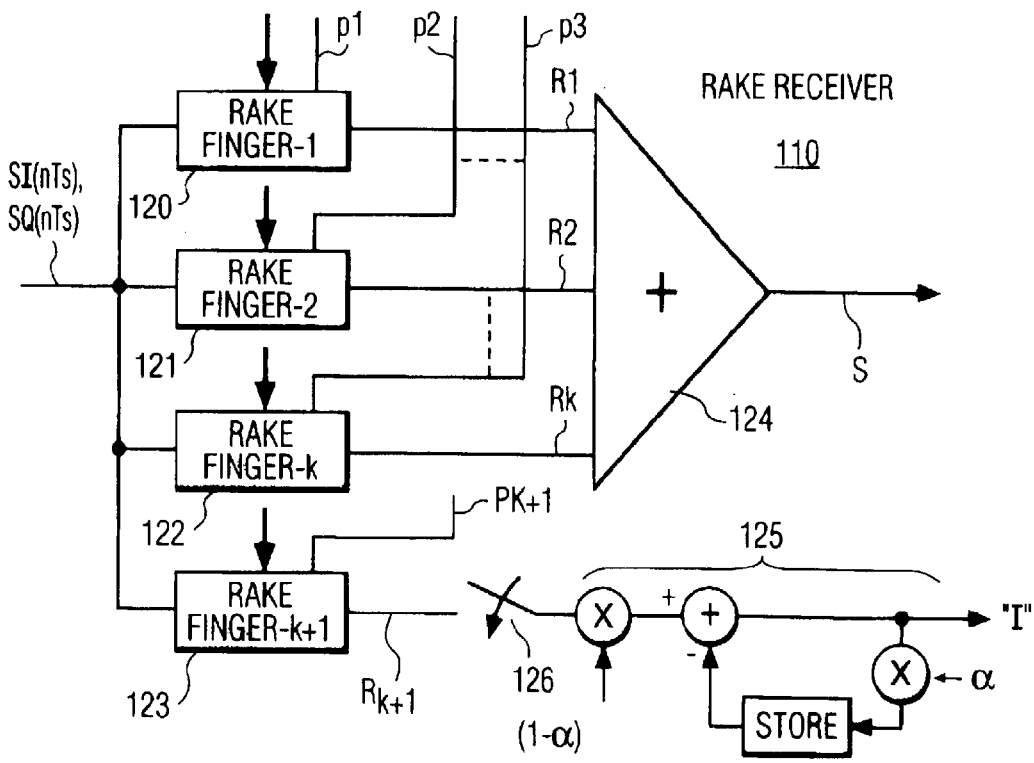
FIG. 4 is a block diagram of a rake receiver in a spread spectrum communication device, according to the present invention.

FIG. 4 is a block diagram of the rake receiver 110 in the spread spectrum communication device 101, according to the present invention. The rake receiver 110 comprises a plurality of receiver branches, k+1 rake fingers where k is an integer. Shown are rake fingers 120, 121, 122 and 123. The respective rake fingers 1, 2, . . . , k provide output signals $R_1$, $R_2$, . . . , $R_k$ to a diversity combiner 124 which diversity combines them to form a multipath received diversity combined signal S. The processor 113 can control power to the individual rake fingers and thereby switch off power to unused rake fingers using power control lines p1, p2, and p3. The bold arrows indicate information from the channel estimator 111. The information includes synchronization information to synchronize pseudo-random sequences to be supplied to the rake fingers 120, 121, 122, 123 with the pseudo-random reference sequence implicitly being present in the received signal s(t). In a spread spectrum system according to the above-mentioned TIA/EIA Interim Standard document, synchronization is determined using a reference sequence that is repetitive after $2^{15}$ chips.

The rake finger 123 provides an output signal $R_{k+1}$ that is used by a conventional IIR filter 125 to estimate the interference (output "I"). A switch 126 is controlled in synchronism with the PCCPCH so that the output signal $R_{k+1}$ is coupled to the IIR filter 125 during a significant portion, or the entirety, of the transmission gap. In a typical application for the 3GPP system, the output signal $R_{k+1}$ is coupled to the IIR filter 125 for the entire 256 chip transmission gap duration. In response to a predetermined sampling period, the IIR filter 125 output the interference "I" to the processor 113 for determining the SIR, as discussed above in connection the FIG. 3.

Figure 5:
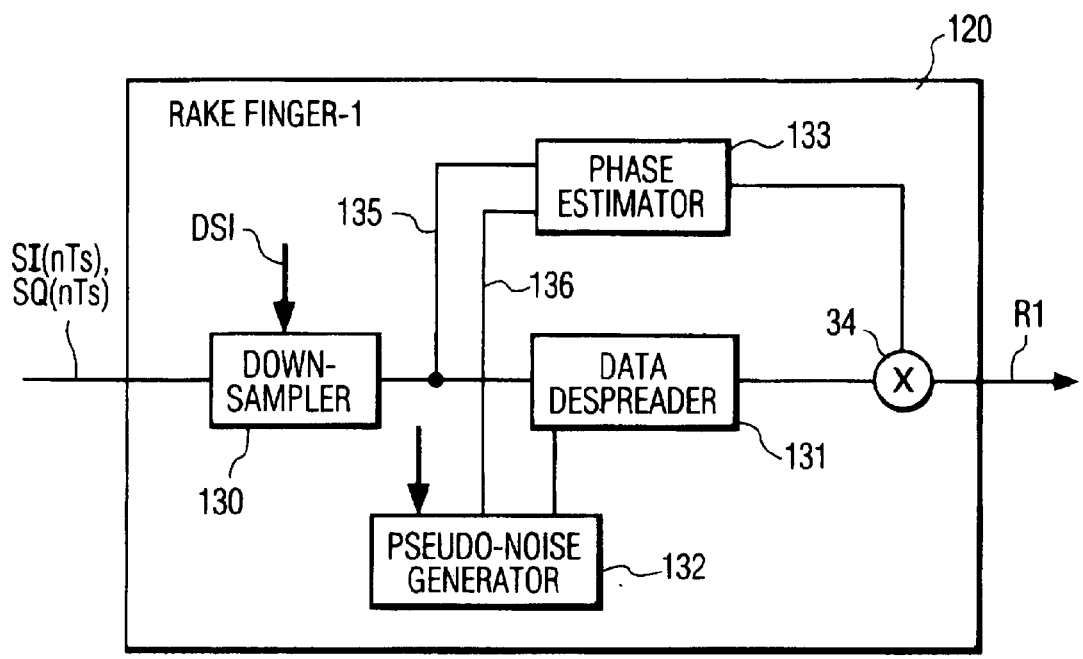
FIG. 5 shows a rake finger in a rake receiver, according to the present invention.

FIG. 5 shows an example construction of the rake finger 120, which is the same as the construction of the rake fingers 120, 121 and 122 of FIG. 4. The rake finger 120 comprises a down-sampler 130, receiving down-sampling information DSI from the channel estimator 111, instructing the down-sampler 111 which samples are to be removed from the input sample stream sI (nTs) and sQ (nTs), so as to select multipath components with a sub-chip resolution. The rake finger 120 further comprises a data de-spreader 131, a local pseudo-noise reference generator 132, a phase estimator 133, and a coherent combiner 134, outputs of the data de-spreader 133 and the phase estimator 133 being coherently combined in the coherent combiner 134.

The rake receiver 123 of FIG. 4 can be constructed in a similar manner as that shown for the rake finger 120 of FIG. 5, with the exception that the rake finger 123 does not require a phase estimation block, such as phase estimator 133 of the rake finger 120. Thus, rake receiver 123 of FIG. 4 corresponds to the illustrated rake finger 120 of FIG. 5 with the removal of the phase estimator 133 and connections 135 and 136.

Figure 6:
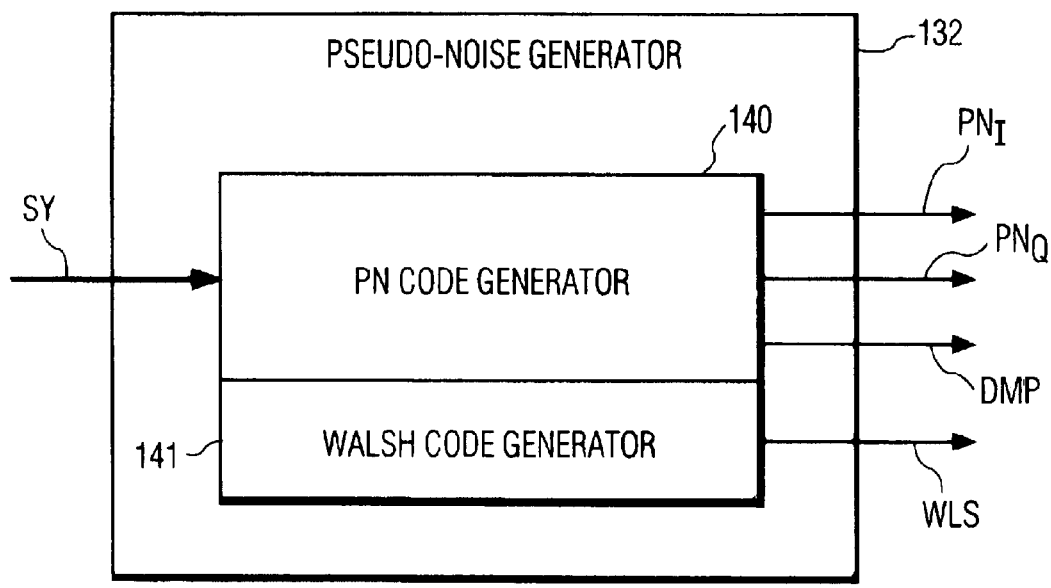
FIG. 6 depicts a pseudo-noise generator for use in a rake receiver according to the present invention.

FIG. 6 depicts the pseudo-noise generator 132 for use in rake fingers (e.g., 120) of the rake receiver 110. The pseudo-noise generator 132 comprises a pseudo noise code generator 140 providing in-phase and quadrature pseudo noise codes $PN_I$ and $PN_Q$, and a Walsh code generator 141 providing a so-called Walsh code WLS. The pseudo-noise generator 132 further provides a dump signal DMP for controlling reading out of the data de-spreader 131 and the phase estimator 133. The pseudo-noise generator 132 is synchronized by the channel estimator 111 so as to synchronize the locally generated pseudo-noise reference sequence to the pseudo-noise reference sequence in the received signal, intended for the rake receiver 110. In the example given, the rake receiver 110 can process signals generated in a narrow-band DSSS CDMA system, such as described in the IS-95-A system.

Accordingly, the present invention provides an accurate method and arrangement of measuring the traffic interference in certain types of CDMA cellular communication systems. Embodiments of the present invention have the advantage of being implemented in straight-forward manner and without requiring burdensome maintenance of additional codes. While the present invention has been described with reference to particular example embodiments, those skilled in the art will recognize that many changes may be made thereto. For example, the various blocks depicted in the figures represent functional aspects that can be implemented using discrete, semi-programmable, fully-programmable signal processing technology, and various combinations thereof Further, the skilled artisan will recognize that the various receiver blocks used to exemplify particular operations are provided merely as examples and are not intended to limit the invention; other receiver arrangements can also be used. These and other embodiments do not necessarily depart from the spirit and scope of the present invention, which is set forth in the following claims.

What is claimed is:

1. A signal-receiving method for use in a DSSS CDMA communication, comprising:
   locating a first control channel that is multiplexed with an other channel in a received communication signal, the first control channel using a first PN code that differs from another PN code that is used by the other channel;
   selecting a transmission gap in the first control channel;
   measuring interference in the transmission gap; and
   determining a signal quality for the received communication signal as a function of the measured interference.
2. The method of claim 1, wherein
   selecting the transmission gap includes identifying a chip interval not greater than 256 chips.
3. The method of claim 2, wherein
   determining a signal quality for the received communication signal includes determining a signal to interference ratio.
4. The method of claim 1, wherein
   selecting the transmission gap includes identifying a chip interval in which data for the other channel is being provided.
5. The method of claim 4, wherein the chip interval is 256 chips.
6. The method of claim 4, wherein
   the first control channel is a primary common control physical channel and the data includes control information for the other control channel.
7. The method of claim 4, wherein
   the first control channel is a primary common control physical channel and
   the data includes control information for a primary SCH and a secondary SCH.
8. The method of claim 1, wherein
   the first control channel is a primary common control physical channel.
9. The method of claim 1, further including
   demodulating the received communication signal to produce a demodulated signal and determining a CDMA slot in which data for the first control channel is transmitted,
   wherein
      measuring interference in the transmission gap includes measuring a power level of the demodulated signals.
10. A signal-receiving method for use in a DSSS CDMA communication system that multiplexes PCCPCH data with SCH data, and that uses orthogonal variable spreading factor (OVSF) and PN codes in spreading the data, the method comprising:
   despreading a received communication signal using corresponding OVSF and PN codes and locating the PCCPCH in the received communication signal;
   selecting a chip period in the PCCPCH channel that corresponds to an interval where there is a transmission gap in the PCCPCH data and where SCH data is being transmitted; and
   measuring interference in the transmission gap and determining therefrom a signal interference ratio for the received communication signal.
11. The method of claim 10, further including
   demodulating signals intended for reception elsewhere in the received signal and
   determining a CDMA slot in which data for the first control channel is transmitted,
   wherein
      measuring interference in the transmission gap includes measuring a power level of the demodulated signals.
12. A signal-receiving arrangement for use in a DSSS CDMA communication, comprising:
   means for locating a first control channel that is multiplexed with another channel in a received communication signal, the first control channel using a first PN code that differs from another PN code that is used by the another channel;
   means for selecting a transmission gap in the first control channel where data is being transmitted in place of the first control channel;
   means for measuring interference in the transmission gap and for determining a signal quality for the received communication signal as a function of the measured interference.
13. A signal-receiving arrangement for use in a DSSS CDMA communication system that multiplexes PCCPCH data with SCH data, and that uses orthogonal variable spreading factor (OVSF) and PN codes in spreading/modulating the data, comprising:

means for despreading a received communication signal using corresponding OVSF and PN codes and locating the PCCPCH in the received communication signal;

means for selecting a chip period in the PCCPCH channel that corresponds to an interval where there is a transmission gap in the PCCPCH data and where SCH data is being transmitted; and means for measuring interference in the transmission gap and determining therefrom a signal interference ratio for the received communication signal.

14. A signal-receiving arrangement for use in a DSSS CDMA communication, comprising:

a receiver front end adapted to demodulate a received communication signal;

a data sampling circuit coupled to the receiver front end and adapted to locate a first control channel that is multiplexed with another channel in the received communication signal, the first control channel using a first PN code that differs from another PN code that is used by the another channel; and a signal processor coupled to the data sampling circuit and adapted to select a transmission gap in the first control channel where data is being transmitted in place of the first control channel and to measure interference in the transmission gap and determine a signal quality for the received communication signal as a function of the measured interference.

15. The arrangement of claim 14, wherein the receiver front end includes a down-converter.

16. The arrangement of claim 15, further including a CDMA slot synchronizer adapted to locate a CDMA slot in which data for the first control channel is transmitted.

17. The arrangement of claim 16, wherein the interference in the transmission gap corresponds to despread signals.

18. The arrangement of claim 17, wherein the data sampling circuit includes a rake receiver.

19. The arrangement of claim 14, wherein the data sampling circuit includes a rake receiver having a plurality of rake finger circuits, each rake finger circuit including a PN generator and a data despreader.

20. A signal-receiving arrangement for use in a DSSS CDMA communication, comprising:

a receiver front end adapted to down-convert a received communication signal; and a signal processor including a data sampling circuit coupled to the receiver front end and adapted to locate a first control channel that is multiplexed with another channel in the received communication signal, the first control channel using a first PN code that differs from another PN code that is used by the another channel, and a rake receiver coupled to the data sampling circuit and adapted to select a transmission gap in the first control channel where data is being transmitted in place of the first control channel, adapted to measure interference in the transmission gap, and adapted to determine a signal quality for the received communication signal as a function of the measured interference.

21. The signal-receiving arrangement of claim 20, further including a plurality of base stations, each base station being configured and arranged to generate the communication signal for reception by the receiver front end, and multiplex the first control channel with the other channel.

22. The signal-receiving arrangement of claim 20, wherein the rake receiver includes a dedicated rake finger adapted to select the first control channel.

23. The signal-receiving arrangement of claim 22, wherein each base station is further configured and arranged to generate the interference as communication signals intended for other rake receivers.

24. A receiver for use in a DSSS CDMA communication system, comprising a downsampler that is configured to downsample a received signal that includes PCCPCH data with SCH data that is encoded via PN codes that spread the data across a frequency spectrum, the PCCPCH data having a first PN code that differs from a second PN code of the SCH data, a despreader that is configured to despread the received signal using the first PN code, and a processor, operably coupled to the despreader, that is configured to measure a signal level from the despreader during a period of transmission of the PCCPCH data, and an interference level from the despreader during a period of transmission of the SCH data.

25. The receiver of claim 24, wherein the processor is further configured to determine a Signal-to-Interference ratio based on the signal level and the interference level.

* * * * *